Patented Oct. 10, 1950

2,524,811

UNITED STATES PATENT OFFICE 2,524,811

DYEING PLASTIC ARTICLES WITH AN AQUEOUS DISPERSION OF DYE DISSOLVED IN A PLASTICIZER

Louis F. Koberlein, New York, N. Y., assignor to Interchemical Corporation, New York, N. Y., a corporation of Ohio No Drawing. Application September 20, 1946, Serial No. 698,401

4 Claims. (Cl. 8—4)

My invention relates to the dyeing of plastics and particularly to a method of surface dyeing, applicable to sheets, castings, mouldings and other products made from plastics, and present in the form of semi-finished and finished articles.

Today, plastics have become irreplaceable for purposes of utility and design and they have not only superseded many older materials, but have conquered numerous new fields and daily find additional new applications. While this outstanding development may partly be explained by the resistance of plastics to breakage and deterioration and partly by their often highly desirable thermal and electrical properties, the success of plastics is due, in many cases, to the light transmitting or translucent qualities of some, and to opaqueness and luster of others.

By either necessity or design, plastics are colored for most applications and, generally, no great difficulties are encountered in dyeing plastics by the usual procedure of incorporating coloring matter in form of dyes or pigments into the ingredients or the composition. When dyed in this manner, the color is imparted to and distributed through the entire mass. While this may be desirable in some instances, it also results in certain disadvantages. In die-casting or in the making of turned products, the colored scraps are often found unsuitable for re-use. The manufacturer of plastics cannot keep an unlimited stock of variously colored material of every specification and the final producer and the customer thus find themselves restricted in their choice of color variations. Two-color effects, as for instance the insertion of white letters in a colored signal light, or multicolored effects, desirable for artistic designs, cannot be obtained with a plastic of which the entire mass has been dyed; but they can easily be produced with surface dyeing.

Whereas, generally, no difficulties are encountered in the surface dyeing of synthetic fibers or textiles from plastic or resinous material, since, in this instance, a slight marring effect on the fiber surface or a somewhat uneven fixation of the color will be of no great concern and since impairment of the form or shape of the fiber does not need to be considered at all, the demands placed upon a dyeing method, to be of any commercial value for the surface dyeing of plastic bodies, are very exacting and prior attempts in this respect have had only limited success.

Stabiilty, within a wide temperature range, of a dye solution for the surface dyeing of plastic bodies during actual use or over extended periods of storage is a primary requirement for reasons of commercial utility. In addition, the dye solution should not be suited to only one type of plastic, but coloration of a number of commercially used materials should be possible with uniformly good results.

Plastics, being practically impervious to water, in order to be surface-dyed, must be brought in a condition where the outermost strata of the micellar structure will have opened up to permit penetration of the dyestuff to the desired depth of the sub-surface. Rigid limitations, however, apply to this "swelling" or "softening," because any excess, as may easily occur, especially where the temperature must be raised in order to speed up the dyeing effect, may warp the plastic article and dull or roughen its surface.

Of the dyes, only those can be used that exhibit solid solution solvency in the specific plastic. Since dyes of this class, generally members of the group of basic dyes without solubilizing groups, unsulphonated azo and anthraquinone dyes and so-called oil soluble dyes, are water-insoluble for the most part, but, as a rule, are solvent-soluble, it would appear that dye solutions for the coloring of plastic bodies should easily be prepared by solubilizing the dyestuff in a solvent and the dyeing itself be accomplished by simply submerging the article in the dye solution, in view of the fact that many solvents act upon plastic and cause swelling and softening in penetrating into the material. However, the action of most solvents is too energetic under such conditions and the swelling proceeds, in a very short time, to a stage far in excess of what is needed for coloring and where the shape, quality or appearance of the plastic article is being seriously harmed.

In order to retard this excessive softening action upon the plastic, prior art workers resorted to water-miscible solvents as the dyestuff carrier and the dye solution was diluted with water prior to its application. Unfortunately, besides that most water-miscible solvents give off obnoxious vapors and that many are highly inflammable, such dye solutions cannot be diluted ad libitum (or, on the same basis, too much of the solvent cannot evaporate) without a separation of the dyestuff from the solution; this notwithstanding the endeavor to overcome the difficulty in adding various stabilizing ingredients. Thus, whenever the dilution is carried too far, part of the dyestuff will separate out, with the result of a streaky, non-uniform dyeing effect. If, on the other hand, dilution has not been carried far enough, the swelling effect of the solvent remains excessive, with the usual result of crazing of the surface, and perhaps, warping of the plastic article.

To overcome these difficulties, the use of only water-miscible solvents was abandoned in favor of solvents of none or only limited water-miscibility, whereby attempts were made to retard the "softening" action upon the plastic by aqueously dispersing the solvent-dye solution with the aid of various dispersing agents. However, it seems that many of the dispersing agents which have been suggested for these purposes as for example, soap, mineral oil, Turkey red oil, sulforicinoleic acid, oleic, stearic, palmitic acids; their alkali or ammonium salts, as well as their sulfonated derivatives; carboxylic sulfonic and phenol sulfonic acid derivatives of the benzene, naphthalene and anthracene series, and many others, produce only dispersions of the emulsoid type, i. e., dispersions where the particles of the dispersed phase are of larger than colloidal size. Such emulsions, notwithstanding the addition of various "stabilizing" salts, as a rule, break upon heating, sometimes when water is being added and often they are not stable when stored.

I have now succeeded in producing dye liquids for the surface dyeing of plastic bodies which do not have the aforementioned shortcomings and it is an object of the present invention to provide such dye liquids.

It is another object of the invention to provide therewith improved methods of dyeing plastic bodies.

These objects I attain with the aid of a specific dispersing agent which permit indefinite diluting of the solvent-dyestuff solutions without either a separation of the dye or breaking of the solvent dispersion. Only where greatly diluted dye liquids are to be heated for longer periods, I prefer the addition of stabilizing salts. The dispersing agents, which I employ, consist of long chain alkali treated sulfonated oils, which have been reacted with a lower aliphatic amine, such as ethanolamine, diethanolamine, triethanolamine, or with morpholine. Of the oils, I prefer sulfonated castor oil, olive oil, corn oil, sesame oil, but mineral oil sulfonates, such as obtained from white oil purification are also suitable. In adding triethanolamine, for instance, to sulfonated castor oil, an exothermic reaction takes place, resulting in the formation of addition compounds which appear to have charactertistics similar to those of triethanolamine salts of fatty acids. The latter are known to be soluble in organic solvents besides being excellent dispersing agents, apparently in view of the plurality of hydrophilic hydroxyl groups in the reaction product. Without attempting to dwell on theoretical speculations whether the superior action of the here described dispersing agents be due to a higher rate of dispersion of a solubility product between solvents and the triethanolamine treated sulfonated oils or be due to the latter acting as a protective colloid, promoting the stability of the heterogeneous system, suffice it to say that my dye liquids, apparently being of the colloidal suspensoid type, have every outward appearance of true solution and retain this character even after extensive aqueous dilution.

When a plastic body is entered into a dye liquor of the aforesaid character, even though the liquor be highly dilute, owing to the superior rate of dispersion, an exceedingly intimate contact is established between the dispersed phase (solvent plus dye) of the dye liquor and the surface of the plastic body. The solvent immediately begins to swell the surface, opening thereby every intermicellar space. The plastic, being hydrophobic, repels the aqueous phase of the dispersion and only the solvent-dye solution, as such, gains access to the interior of the material. Given sufficient time, the plastic body may be completely permeated with dye and solvent, but after removal from the dye liquor, the solvent, present in the plastic, is gradually released by evaporation, whereas the color is permanently incorporated as a solid solution. Of dyestuffs, I found most acetate dyes (azo and anthraquinone dyes), and the so-called "oil soluble dyes" without solubilizing groups applicable, in that these dyes exhibit affinity to various types of plastic material and are solvent soluble.

An almost unlimited choice is provided in selecting solvents for this purpose; solubilizing effect on the dyestuff and rate of swelling induced in the plastic being the only limiting criteria. Of the water miscible solvents, any of the following may be used: aliphatic ketones, such as acetone; lactones, such as gamma-valerolactone; lower alcohols, such as methanol, ethanol, iso-propanol, methyl pentanediol; ethers, such as dioxane; glycol ethers, such as butyl "Carbitol," (diethyleneglycol butyl ether) "Cellosolve" (ethylene glycol monoethyl ether), butyl "Cellosolve" (ethylene glycol monobutyl ether); glycol ether-esters, such as methyl "Carbitol" acetate (methyl ether of diethyleneglycol monoacetate); aromatic or terpene alcohols, aromatic acids.

I prefer, however, mainly for reasons of operation hazards, the use of water-immiscible solvents and found that the following are suitable for my purposes; higher alcohols, ketones, cyclic ketones, cresols, lactones, nitro-hydrocarbons and many others. More specifically, I have made use of n-butanol, isophorone, cresylic acid, p-cresol, o-phenyl-phenol, phenoxyethanol, pine oil, cyclohexanone, butyl acetate, acetophenone, methyl acetophenone, nitro ethane, nitro propane, nitro isopropane, methyl iso-butyl ketone, butyl Carbitol acetate.

Many others will work and it is to be understood that the enumerated solvents are given as examples and that my invention is not limited to the use of these.

While excellent results are obtained by using a single solvent, especially of the water-insoluble type, mixtures of mutual solvents may be used advantageously, especially mixtures of water-miscible solvents with such of the water-insoluble type.

In practicing my invention, a specific amount of dyestuff is added to the solvent or to the mixture of solvents. The amount of dyestuff is controlled by the maximum quantity soluble. To this dye solution the dispersing agent is added, consisting, in the preferred embodiment, of the reaction product of 75 parts sulfonated, alkali-treated castor oil and 25 parts triethanolamine. It appears that close adherence to this ratio is of imporatnce, since variations thereof beyond ±5% begin to impair the dispersing qualities of the reaction product. As a rule, an amount of the dispersing agent is added, equivalent to three times the weight of the solvent or solvents, but this amount may vary with the type of solvent or mixture of solvents that are being used.

In furnishing this dye concentrate, an improved method of dyeing is provided. The consumer may adjust the strength of the dye bath in accordance with his requirements since the concentrate may be diluted in any proportion without fear that solvents or dyestuff may separate from the liquid. The concentrate liquids are stable for an indefinite period. However, where highly dilute dye liquids are to be held at elevated temperatures for any extended time, the use of stabilizing salts will be advisable. Since the stabilizing salts readily dissolve in water, the best way to add them is to use a salt solution in diluting the dye concentrate before use. I obtain satisfactory results by adding a mixture of disodium phosphate and sodium nitrite, in a ratio of 8 parts disodium phosphate and 2 parts sodium nitrite, per 10 parts solvent, contained in the dye concentrate.

Plastic bodies made from phenol-formaldehyde, allyl-phenol resins, cellulose acetate and other cellulose derivatives, such as nitrocellulose, alkyl cellulose esters and ethers; polyamides, acrylate polymers, polystyrene resins, vinylidine chloride polymers, such as Saran or Vinyon; alkyd resins such as Glyptal and natural resins may be surface colored in this manner with excellent results. They are dyed by simply immersing them in a dye bath of proper concentration. Although dyeing at room temperature is the preferred procedure with some polymers, with others, such as Saran or polystyrene and wherever the time factor must be considered, dyeing at a higher temperature may be advisable in order to accelerate the process. Cellulose derivatives, vinylidine polymers, Glyptals and natural resins dye fast at relatively low temperatures; at 25° C., for instance, tints may be obtained within seconds and medium shades after an immersion of five to ten minutes. When the desired shade is reached, the article is removed from the dye bath, rinsed with cold water and allowed to dry. Level shades are obtainable without distortion, "crazing" or "crocking" of the plastic.

Color variations from the most delicate tints to the deepest shades can be produced at will, depending upon the concentration of the dye liquor and the time and temperature of exposure. The colors do not crock, but can be buffed off. It is possible to form the plastic bodies in any desired shape before or after dyeing. A selective use of solvents will eliminate any danger of combustion, toxic or obnoxious vapors, loss of strength of the dye solution through evaporation and the need for air conditioning equipment.

Although the specific purpose of these dye liquids is to dye plastic bodies without the previously encountered difficulties, they may advantageously be used for the dyeing of metals and other materials covered with a plastic film. Tin plate, covered with a baked enamel or vinyl film, for instance, can be evenly colored in this manner. Fibers or fabrics, made entirely or in part of plastic or synthetic resins may be dyed similarly. Essentially, the same formulae, but without the addition of the dyestuff, may be used for removal of color from previously dyed plastic material. In combination with patterned protective coatings, multicolor effects may thus easily be obtained in this manner.

As illustrative embodiments of the manner in which the invention may be practiced the following examples are presented:

*Example I*

Sulphonated castor oil is thoroughly mixed with triethanolamine, in a ratio of three to one parts by weight. This solution is a stock solution of a dispersing agent used in making dye liquors such as listed below.

*Example II*

The sulphonated castor oil of Example I is replaced by sulphonated corn oil.

*Example III*

The triethanolamine of Example I is replaced by morpholine.

*Example IV*

A dye liquor concentrate is produced by dissolving 0.9 part Acetate Rubine dye in 10 parts isophorone and mixing this solution thoroughly with 30 parts of the dispersing agent of Example I.

*Example V*

A similar dye liquor concentrate is produced by dissolving 0.9 part Azo Acetate Scarlet Base in 10 parts phenoxyethanol and mixing this solution with 30 parts of the dispersing agent of Example III.

*Example VI*

0.5 part Anthraquinone Brilliant Blue B dye are dissolved in 10 parts Cresylic acid and this solution stirred into 30 parts of the dispersing agent of Example II.

*Example VII*

Same as Example IV, except that 0.3 part Acetate Blue NR is used as the dyestuff.

*Example VIII*

A similar dye liquor concentrate is made with 0.5 part of Oil Brown dye.

*Example IX*

A similar dye liquor concentrate is made with 0.33 part Acetate Violet dye.

*Example X*

0.35 part Acetate Pink dye is dissolved in 10 parts methyl isobutyl ketone and a dye liquor concentrate is prepared by mixing this solution into 30 parts of a three to one mixture of sulfonated white mineral oil with triethanolamine.

*Example XI*

A dye liquor concentrate for dyeing plastic a fine green is prepared by dissolving 0.25 part Aacetate Blue NR and 1.0 yellow G dye in 10 parts isophorone and adding this solution to 30 parts of the dispersing agent of Example I.

*Example XII*

A dye liquor concentrate, useful for imparting black color to plastic, is produced in a similar manner from 0.55 part Acetate Blue NR and 0.18 part Orange NR dyes.

*Example XIII*

A dye liquor concentrate for producing yellow colored plastics is prepared by dissolving 1.5 parts Azo acetate yellow Base G dye in 10 parts isophorone and mixing the solution with 30 parts of one of the described dispersing agents.

The dyes used in the foregoing examples can be identified and other suitable dyes can be found in the "1945 Year Book of the American Association of Textile Chemists and Colorists, volume XXII" under the classifications: "Dyes, direct on Acetate rayon" and "Oil soluble;" of the latter, those without solubilizing groups will prove satisfactory.

The water-immiscible solvents of the preceding examples may be replaced by water-soluble solvents.

Example XIV 0.5 part Acetate Blue NR dye is dissolved in 10 parts gamma valerolactone and this solution is mixed into 30 parts of the dispersing agent of Example I.

A mixture of water-insoluble and water-soluble solvents may be used in the formulation.

Example XV 0.5 part Acetate Blue NR dye is dissolved in a mixture of 5 parts dioxane and 5 parts isophorone and the solution added to 30 parts of the dispersing agent of Example I.

Dye liquor concentrates such as given in the foregoing examples remain indefinitely stable. They may be cut with any amount of water without endangering the stability of the dispersion, but they should be diluted only shortly before the dyeing because some tend to lose color strength when standing for an extended period after water has been added. In order to avoid a break of the dispersion, which may occur if a dilute dye liquor is heated for several hours, stabilizing salts are added, preferably when cutting the dye liquor concentrate.

Example XVI

In order to color an article made from acrylate polymer (Plexiglas) in a deep rubine shade, the dye liquor concentrate of Example IV is diluted with water at a volumetric ratio of one to five, whereby, prior to the cutting, 20 parts of disodium phosphate and 5 parts sodium nitrite per each 100 parts by weight of the dye liquor concentrate are dissolved in the diluent. This dye liquor is heated to a temperature of 55 to 65° C., the plastic article immersed therein for 10 min., taken out, rinsed with water and dried.

Example XVII

The same dye liquor colors, at a temperature of 20–25° C., an article from cellulose acetate a deep rubine shade within 3 min. and a cellulose acetate sheet within 1 min.

Example XVIII

The dye liquor concentrate of Example VII is diluted with 5 parts of water, whereby, prior to the cutting, 20 parts of di-sodium phosphate and 5 parts sodium nitrite per each 100 parts by weight of the dye liquor concentrate are dissolved in the water which is to be used for diluting. When an article made from polystyrene is immersed in the dye liquor held at a temperature of 60 to 65° C., it produces a medium shade of blue within 10 minutes.

Example XIX

A dye liquor is prepared in the same manner from the concentrate of Example XI. It colors a Vinylite article a deep green within 10 minutes at a temperature of 20 to 25° C. and an article made from a vinylidine chloride polymer (Saran) to about the same shade of green within 60 minutes at 55 to 60° C.

Example XX

An article made from phenol-formaldehyde is dyed a medium blue by diluting the dye concentrate of Example XIV with water in a ratio of 5 to 1, adding 20 parts of disodium phosphate and 5 parts sodium nitrite per each 100 parts by weight of the dye liquor concentrate, and immersing the article for 5 min. in the dye bath, held at a temperature of 55–60° C.

Since changes may be made in carrying out the invention without departing from its scope, it is intended that all matter contained in the above description shall be interpreted as illustrative and not in a limiting sense.

I claim:

1. A stable dye liquor for the dyeing of plastic articles long in at least two dimensions, comprising the dispersion of a dye liquor concentrate consisting of a dye normally insoluble in water, a water-immiscible solvent for the dye, characterized by causing a swelling of the plastic article and the reaction product of a sulfonated oil with an alkylolamine, in a diluent consisting of an aqueous solution of sodium phosphate and sodium nitrite.

2. A stable dye liquor for the dyeing of plastic articles long in at least two dimensions, comprising the dispersion of a dye liquor concentrate consisting of an acetate dye, a water-immiscible solvent for the dye, characterized by causing a swelling of the plastic article and the reaction product of a sulfonated oil with an alkylolamine, said solvent and said reaction product being present at a weight ratio of about three parts of the reaction product for every part of the solvent, in a diluent consisting of an aqueous solution of about 20 parts sodium phosphate and 5 parts sodium nitrite for every 25 parts of the said solvent.

3. The dye liquor according to claim 1, wherein the solvent is isophorene.

4. A stable dye liquor for the dyeing of plastic articles long in at least two dimensions, comprising the dispersion of a dye liquor concentrate consisting of a dye normally insoluble in water, a water-immiscible solvent for the dye, characterized by causing a swelling of the plastic article and the reaction product of about three parts alkali neutralized sulfonated castor oil and one part triethanolamine, said solvent and said reaction product being present at a weight ratio of about three parts of the reaction product for every part of the solvent, in a diluent consisting of an aqueous solution of sodium phosphate and sodium nitrite, said diluent being present at a volumetric ratio of about five parts of the diluent for every part of the dye liquor concentrate.

LOUIS F. KOBERLEIN.

REFERENCES CITED

The following references are of record in the file of this patent:

UNITED STATES PATENTS

| Number | Name | Date |
|---|---|---|
| 1,799,821 | Kern and Sala | Apr. 7, 1931 |
| 1,884,068 | Mendel | Oct. 25, 1932 |
| 1,968,819 | Dreyfus | Aug. 7, 1934 |
| 2,121,021 | Cornwell | June 21, 1938 |
| 2,156,442 | Wood | May 2, 1939 |
| 2,188,160 | Rooney et al. | Jan. 23, 1940 |
| 2,328,903 | Heymann | Sept. 7, 1943 |
| 2,347,508 | Rugeley and Feild | Apr. 25, 1944 |

FOREIGN PATENTS

| Number | Country | Date |
|---|---|---|
| 539,673 | Great Britain | Sept. 19, 1941 |

OTHER REFERENCES

"Textile Bulletin," Article by Quinn, pages 39 to 41, Sept. 15, 1941.